(12) United States Patent
Lande

(10) Patent No.: US 10,969,483 B2
(45) Date of Patent: Apr. 6, 2021

(54) COUPLED RADAR

(71) Applicant: Novelda AS, Oslo (NO)

(72) Inventor: Tor Sverre Lande, Oslo (NO)

(73) Assignee: Novelda ASA, Kviteseid (NO)

( * ) Notice: Subject to any disclaimer, the term of this patent is extended or adjusted under 35 U.S.C. 154(b) by 387 days.

(21) Appl. No.: 15/752,827

(22) PCT Filed: Aug. 12, 2016

(86) PCT No.: PCT/GB2016/052518
§ 371 (c)(1),
(2) Date: Feb. 14, 2018

(87) PCT Pub. No.: WO2017/029483
PCT Pub. Date: Feb. 25, 2017

(65) Prior Publication Data
US 2018/0239013 A1    Aug. 23, 2018

(30) Foreign Application Priority Data
Aug. 14, 2015  (GB) .................................. 1514520.4

(51) Int. Cl.
*G01S 13/88* (2006.01)
*G01S 13/90* (2006.01)
(Continued)

(52) U.S. Cl.
CPC .......... *G01S 13/885* (2013.01); *G01S 7/2927* (2013.01); *G01S 13/888* (2013.01); *G01S 13/89* (2013.01);
(Continued)

(58) Field of Classification Search
None
See application file for complete search history.

(56) References Cited

U.S. PATENT DOCUMENTS

2006/0066469 A1    3/2006  Foote et al.
2009/0140159 A1*   6/2009  Tomita ................... G01T 1/247
                                                 250/394

FOREIGN PATENT DOCUMENTS

CN      102360070 A    2/2012
EP       2600167 A1    6/2013
(Continued)

OTHER PUBLICATIONS

International Search Report and Written Opinion for PCT/GB2016/052518, dated Nov. 2, 2016, 11 pages.
(Continued)

*Primary Examiner* — Whitney Moore
(74) *Attorney, Agent, or Firm* — Klarquist Sparkman, LLP (57) ABSTRACT

A method of imaging within an absorptive object comprising: placing transmit and receive antennas in close proximity to a surface of said object; transmitting electromagnetic pulses from the transmit antenna into the object; and receiving a receive signal at the receive antenna simultaneously with the transmit antenna transmitting said pulses; wherein the transmitting and receiving comprises the following steps: a) setting a threshold level for the receive signal strength; b) transmitting one or more pulses; c) comparing the receive signal for said one or more pulses with the threshold level; d) changing the threshold level; e) repeating steps b), c) and optionally d) one or more times. This arrangement can operate at extremely high speed due to the absence of any slow multi-bit ADCs.

14 Claims, 2 Drawing Sheets

(51) Int. Cl.
*G01S 7/292* (2006.01)
*G01S 13/89* (2006.01)

(52) U.S. Cl.
CPC .............. *G01S 13/904* (2019.05); *G01S 13/90* (2013.01); *G01S 13/9064* (2019.05)

(56) References Cited

FOREIGN PATENT DOCUMENTS

| | | |
|---|---|---|
| FR | 2645307 A1 | 10/1990 |
| GB | 2346752 A | 8/2000 |
| WO | WO 2012/038734 A1 | 3/2012 |
| WO | WO 2010/042893 A2 | 4/2020 |

OTHER PUBLICATIONS

Search Report under Section 17(5) from United Kingdom Intellectual Property Office for GB1514520.4, dated Feb. 1, 2016, 3 pages.

\* cited by examiner

COUPLED RADAR

CROSS REFERENCE TO RELATED APPLICATIONS

This is the U.S. National Stage of International Application No. PCT/GB2016/052518, filed Aug. 12, 2016, which was published in English under PCT Article 21(2), which in turn claims the benefit of Great Britain Application No. 1514520.4, filed Aug. 14, 2015.

The invention relates to methods and devices for coupled radar. In particular, the invention relates to coupled radar that can be used at short range.

Many materials absorb radio frequency (RF) electromagnetic (EM) radiation strongly. Such materials may be referred to as heavily absorptive. When radar is directed at such materials, most of the incident energy is back-scattered and only a small amount of the radiation penetrates the material. The waves which enter the material are often also attenuated quickly. This property of materials is employed to great effect in traditional radar uses such as aircraft detection and monitoring as it causes highly absorptive materials like metal to reflect RF waves back to the radar unit where they can be detected.

For this reason, radar imaging within absorptive materials is restricted. EM waves directed at an absorptive material object from afar will be strongly reflected at the air-material boundary. Insufficient energy penetrates the material to produce detectable reflection signals from within the object that could reveal information about the interior of the object. Typically about 75% or more of the incident energy is reflected at the surface.

To avoid the issue of reflections, the EM source antenna and the receiving antenna can be placed close to the absorptive material surface. When the distance between the antennae and the material surface is less than a quarter wavelength, RF coupling occurs, reflection from the air-object boundary is greatly reduced and transmission into the absorptive material is enhanced as a function of the conductivity of the coupled material.

For highly conductive (high loss) materials it may be necessary to insert a layer of low-loss (low conductivity) material with similar dielectric (permittivity) properties avoiding energy loss in the reactive near field. This layer may be glued onto the antennas, but other arrangements may also apply. A fixture on the antenna is normally best for optimal location of the spacer. Both solid and soft (e.g. fluid filled bags) may be used.

This effect is used in Ground Penetrating Radar (GPR) to image deep underground, e.g. for geological examination, archaeological investigation, identification of buried service pipes/conduits, etc.

Most radar systems suffer from problems at close range. This is not usually an issue for longer range radar detection systems, but for coupled radar implementations the close range becomes of more interest. The range is limited to a minimal distance from the antennas due to the presence of a strong direct path from the transmit antenna along the surface of the absorptive medium to the receive antenna. As the receiving circuits are typically tuned for detecting weak backscattered signals from depth (and the dynamic range is not sufficiently large to detect both weak and strong backscattered signals at once), this strong direct path signal will saturate the receiving circuits, preventing other signal detection. Once saturated, the receiving circuits take time to return to a normal detection state. Therefore reflections from shallower depths will not be detectable. The normal solution to this problem is simply to turn off the receiving circuits until the transmit circuit has finished transmitting. When the transmission is finished, the receiving circuits are switched on. Once the receiving circuits are up and running, detection of reflected waves can begin. This sets the minimum distance for detection in classical radar modelling.

Depending on radar architecture and application the limited short-range properties may not be a problem. However, a number of close-range radar applications are limited by heavy electromagnetic absorption due to conductive properties of the exposed material. Increasing distance within the absorptive material will attenuate the signal, thus preventing both sensing and imaging, while short-range detection is impossible due to transmitting interference with the backscattered signal. Thus the useful range is squeezed at both ends. Thus great care must be taken to miniisel signal loss and attain high sensitivity.

According to one aspect, the invention provides a method of imaging within an absorptive object comprising:
  placing transmit and receive antennas in close proximity to a surface of said object;
  transmitting electromagnetic pulses from the transmit antenna into the object; and
  receiving a receive signal at the receive antenna simultaneously with the transmit antenna transmitting said pulses;
  wherein the transmitting and receiving comprises the following steps:
  a) setting a threshold level for the receive signal strength;
  b) transmitting one or more pulses;
  c) comparing the receive signal for said one or more pulses with the threshold level;
  d) changing the threshold level;
  e) repeating steps b), c) and optionally d) one or more times.

According to another aspect, the invention provides a coupled radar apparatus comprising:
  a transmit antenna adapted for placement adjacent to a surface of an absorptive material;
  a receive antenna adapted for placement adjacent to a surface of an absorptive material;
  a pulse generator arranged to transmit electromagnetic pulses from the transmit antenna into the object; and
  a receiver arranged to receive a receive signal at the receive antenna simultaneously with the pulse generator transmitting said pulses;
  a processor operably connected to the pulse generator and the receiver, wherein the processor is arranged to carry out the following steps:
  a) setting a threshold level for the receive signal strength;
  b) transmitting one or more pulses;
  c) comparing the receive signal for said one or more pulses with the threshold level;
  d) changing the threshold level;
  e) repeating steps b), c) and optionally d) one or more times.

The above method and apparatus can operate at extremely high speed due in part to the absence of any slow multi-bit ADCs. The usual approach to sampling an incoming signal is to use an ADC with sufficient resolution (i.e. a sufficient number of bits) to record the incoming signal level in enough detail to enable the receive signal to be processed and analysed. For example an 8-bit ADC can determine the incoming signal to be at any one of 256 different levels, while a 4-bit ADC can only discriminate 16 different signal levels. It is difficult (and expensive) to make fast ADCs with high resolution. The higher the number of levels required, the more difficult and expensive they are to make. Therefore speed and dynamic range do not go well together; if the ADC is to operate at speed, the dynamic range must be reduced. In coupled radar applications, very high sampling rates are required due to the speed of the EM waves within the medium. At the same time, a high dynamic range is required if both the strong direct path signal and the weaker signal from depth are both to be received, detectable and distinguishable simultaneously. The invention uses a comparator to compare the incoming signal to a threshold level. This is effectively a 1-bit ADC which simply quantises the incoming signal into two levels; above threshold and below threshold (which may be denoted by sign, i.e. positive and negative). A simple comparator can operate at high speed and thus can provide the time resolution required for signal processing. At the same time, according to the invention, the threshold against which the comparator compares the signal is adjustable, i.e. the quantisation level is adjustable. This provides the high dynamic range that makes coupled radar applications possible. The comparator's threshold can be provided by a DAC with a large number of output levels (e.g. 8-bit or higher) that correspond to a large sampling resolution. By performing repeated measurements while varying the threshold level, measurements can be taken at a large number of sampling levels (providing resolution in signal strength) while maintaining resolution in time through the use of a simple (and fast) comparator.

If the receive signal is being received from a very shallow depth, there may be sufficient received signal strength from a single transmitted pulse that it is still detectable above the noise level. Therefore once a suitable threshold has been found that distinguishes the received signal from the noise, further processing may proceed immediately to analyse the received signal. However, in many cases, due to the high absorbance in the medium, the received signal will be highly attenuated and may be below the noise level that is present from other interfering signals. In such cases, repeated measurements taken sufficiently fast (in relation to the movement speed of any objects/interfaces being examined) can be accumulated such that uncorrelated noise cancels out on average while the signal adds up on average. Therefore preferably the steps b) and c) above are repeated at least once prior to changing the threshold in step d). Steps b) and c) may be repeated at least 100 times prior to changing the threshold in step d). Alternatively, steps b) and c) may be repeated a large number of times, e.g. at least 1000 times prior to changing the threshold in step d). Indeed more repetitions are better for providing a stronger accumulated signal and therefore tens/hundreds of thousands or even a million or more pulses may be accumulated in the receive signal for increased reliability (processing gain). Preferably enough pulses are accumulated to bring the received backscattered signal level significantly above the noise level. The number of pulses used for each measurement limits the time/temporal response of the radar (i.e. limits its framerate). In order to detect scatterers accurately, the scatterers must not move too much between successive frames and this therefore puts a limit on the number of pulses per frame.

Each measurement at a given threshold provides information about the signal in relation to that threshold level. Preferably the changes to the threshold in step d) change the threshold amongst a set of threshold values. The threshold values in the set correspond to values of interest in the signal, i.e. reference levels in relation to which it is desired to know the level of the received signal. By taking a plurality of measurements at a plurality of different thresholds and accumulating the information gathered at each measurement, more detail can be built up about the received signal. The plurality of threshold levels can be sampled in any order. In many convenient embodiments, the plurality of threshold levels will be polled in an ascending or descending order. The plurality of threshold levels do not necessarily need to be adjacent levels that can be output by the DAC, but could be spaced apart to cover a larger range without including all intermediate output values of the DAC. However, for the best resolution, the plurality of threshold values includes one or more ranges of adjacent output levels of the DAC. As above, the plurality of threshold values can be polled in any order, but in many convenient embodiments, the changes to the threshold value in step d) sweeps through a range of threshold values between a minimum threshold value and a maximum threshold value. The range of threshold values may encompass the full range of potential signal values to be examined in a single range (which may be the minimum/maximum threshold values available, or may be a smaller range). However, in other embodiments there may be two or more ranges of interest and the threshold value may be swept through each in turn. The different ranges may represent ranges of potential signal value that have been pre-identified as relevant with areas of less (or no) significance in between. By concentrating only on areas of significance there are two benefits. The first benefit is that more measurements can be taken at each signal level of interest, thus providing better, more accurate data. The second benefit is that a full data set can be acquired in a shorter period of time. These benefits can be alternatives, or both can apply to varying degrees depending upon the particular application scenario and to what extent fast measurements and measurement accuracy are priorities. A smaller threshold sweep range means more time is available for repeated measurements, which in turn permits better signal extraction from noise. When conducting sweeps through a range of threshold values, it is preferred to conduct the sweeps in a triangular waveform rather than a sawtooth waveform, i.e. a sweep from low to high is followed by a sweep from high to low and vice versa. Due to the high speed at which the system operates, it has been found that large step changes in the threshold value can inject significant noise through power lines and/or capacitive coupling between interconnects. Smaller step changes do not encounter such problems and thus the triangular waveform produces more accurate results.

The appropriate set of threshold values, or ranges of values to be examined may be determined by software based on previous values. Purely as an example, a few full range sweeps may be conducted to determine an approximate signal shape and then one or more sub-ranges may be selected around regions of interest so as to enable faster and more accurate subsequent data gathering.

In some embodiments, the threshold levels may be adjusted so as to search for a signal (or signals) of interest. If no signal is found within an initial threshold range, the range can be expanded or moved according to a search strategy. Purely as an example, the range could initially be expanded to the full available threshold range to see if a signal can be detected, then divided down into progressively smaller sub-ranges to be tested individually until a suitable receive signal is found.

In order to provide a time representation of the receive signal, the receive signal is preferably sampled at a series of points in time and these samples are each compared with the threshold level.

Preferably a counter array has an element for each sample time in the series and each time a receive signal corresponding to that sample time is compared with the threshold, the array element corresponding to the sample time is altered dependent upon the result of the comparison. It will be appreciated that the alteration may simply be to increment the value of the array element when the receive signal is greater than the threshold so as to provide a count of the number of times the threshold has been exceeded. It will be appreciated that the concept of a count in this document encompasses any form of accumulating frequency of occurrence. For example counting down from a fixed value could be used to produce the same numerical result and is thus deemed equivalent to counting up.

As the threshold level is changed amongst a set of values (e.g. a range of values), the counter array values continue to build up, accumulating counts from multiple threshold comparisons and thereby building up information about the signal level at higher resolution.

The counter array elements may be periodically reset when a new overall measurement is to be started. As discussed above, this may be simply zeroing all elements of the array, or it could involve setting all elements to a preset value. The average counter value will reflect the long-term signal average including noise and component variations and may be stored between measurements as well. One advantage is that the SNR is improved since the noise is reduced greatly, thus improving sensitivity. However, if the reflecting object is moving, there is a limit on how long the signal can be averaged without losing information about the object, so there is a trade-off between sensitivity and temporal resolution.

The signal sampling could take place with a single comparator, with the output samples in time being directed to different elements in the counter array in series. One alternative way of performing this operation is to pass the receive signal through a delay line with a plurality of taps (one for each sampling time). Each tap could feed the receive signal to its own comparator where it is compared with the threshold level. With this arrangement the comparisons can all be performed simultaneously and all counter array elements can be adjusted (e.g. incremented) simultaneously. However, a preferred arrangement is to use a single comparator, the output of which is simultaneously made available to all counters. The counters are then enabled in sequence (i.e. in time order) by the delay line (specifically, each counter is enabled by a separate tap of the delay line). A trigger signal propagating through the delay line will briefly enable each counter in turn, upon enablement, the counter will add the current comparator output (either a zero or a one) to its stored count value. The trigger signal may be provided by a delayed version of the transmitted pulse signal. The counters may be considered as a sampler unit, but instead of a clock being used to trigger the samples, the delayed pulse trigger signal is used to trigger the samples. Thus there is no high speed clock requirement for the counting/sampling process (which may take place at extremely high speed, e.g. GHz). The avoidance of high speed clocks avoids the corresponding need for excessive chip area and high power consumption.

In some embodiments the number of delay line taps (i.e. the number of simultaneous detection paths, and therefore also the number of delay line delay elements and the number of counter array elements) is greater than 50, preferably greater than 100, more preferably greater than 200 and in some embodiments greater than 500. Specific examples include 256 simultaneous detection paths and 512 simultaneous detection paths.

Preferably after step e), signal processing is used to subtract a direct path signal component from the received signal data. Because the detection system described above permits a high dynamic range with high sensitivity, both the high amplitude direct path signal and the low amplitude backscattered signal can be received and differentiated within the received signal data. The direct path signal is generally not of significant interest as it has travelled along the surface of the object being examined and does not provide information regarding the interior. It is simply a slightly attenuated version of the transmitted signal with a delay that is readily measurable. Thus it can readily be subtracted from the received signal data, leaving just the backscattered signal which provides information about scatterers within the object.

The pulses transmitted by the pulse generator and the transmit antenna are preferably ultra wideband (UWB) pulses as these allow significant signal energy to be transmitted within publicly available spectrum without exceeding the regulation transmission limits associated with such spectrum. For example, in the US, the UWB band from 3.1-10.6 GHz is available with a transmission limit of −41.3 dBm/MHz. Preferably, for best use of this spectrum, Gaussian or Gaussian derivative pulses (or approximations thereto) are used to tailor the transmissions to the available bandwidth.

The use of a comparator to quantise the incoming signal means that the quantised signal is digital in value. When sampled by the delayed trigger signal and accumulated in the counters a digital signal both in time and value is available for further processing.

By sampling the signal at a fast rate and using the time-averaging technique to provide dynamic range and sensitivity, the drive and receive circuits can be produced entirely in CMOS technology and benefit from the high operating speed of such devices. Additionally, the circuits can be formed on a single, small and low power chip.

In some arrangements, a low-loss, matched dielectric material may be provided between at least one of the transmit and receive antennae (preferably both) and the surface of the object (absorptive material). Preferably the low-loss, matched dielectric material is provided adjacent to the object surface.

It will be appreciated that the preferred features described above are equally applicable to both methods and apparatuses.

Preferred embodiments of the invention will now be described, by way of example only, and with reference to the accompanying drawings in which.

Figure 1:
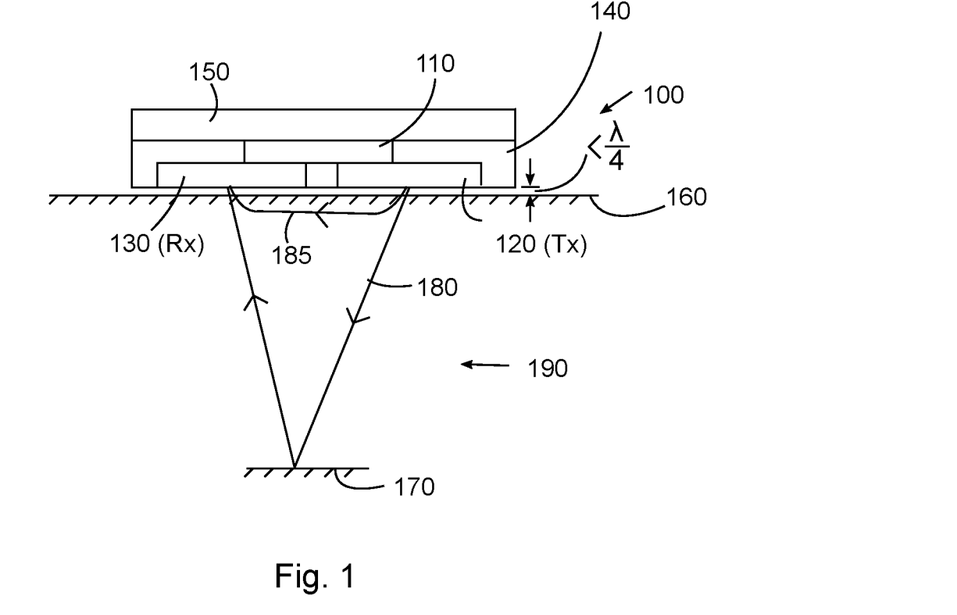
FIG. 1 shows a chip-on-antenna coupled radar device.

FIG. 1 shows an embodiment of a coupled radar apparatus 100. A radar chip 110 contains the circuitry for the transmit pulse generator and for the receiver and signal analysis (described further below). The chip 110 is mounted on a PCB 140 (which may be a flexible PCB) and is connected to transmit antenna 120 and receive antenna 130 each of which are also mounted to the PCB 140. Chip 110 is in fact mounted on the antennas 120, 130. In this way, all of the RF signal can be matched and contained on the apparatus 100 itself avoiding costly co-axial wiring and keeping the module size to a minimum. The PCB 140 could be rigid in some embodiments, but a flexible PCB 140 is preferred so that it can mould to the shape of the surface to be examined, thus ensuring good coupling. The flexible PCB 140 may be made of a conductive felt for example. A foam backing 150 may be mounted on the rear surface of the device 100 (i.e. the surface opposite the antennas, facing away from the object under investigation). This foam backing layer 150 shields the chip and antennas from other interfering signals as well as preventing signal loss through the back of the device 100. The coupled radar apparatus 110 is positioned less than a quarter wavelength from a surface 160 of an absorptive material 190 so as to ensure good coupling. A low-loss material with matched dielectric properties may be added preventing shorting of the reactive near-field of the antenna.

FIG. 1 illustrates the path 180 of a transmitted pulse emitted from the transmit antenna 120, passing through the absorptive medium 190, reflecting off a scatterer 170 and being received by receive antenna 130. As shown, the radar device 100 is positioned less than a quarter wavelength from the surface of the absorptive medium 190 so as to ensure good coupling and thus good signal transmission into the medium 190. FIG. 1 also illustrates the direct path 185 by which the transmitted pulse travels along the surface of the absorptive medium 190 from the transmit antenna 120 directly towards the receive antenna 130.

Figure 2:
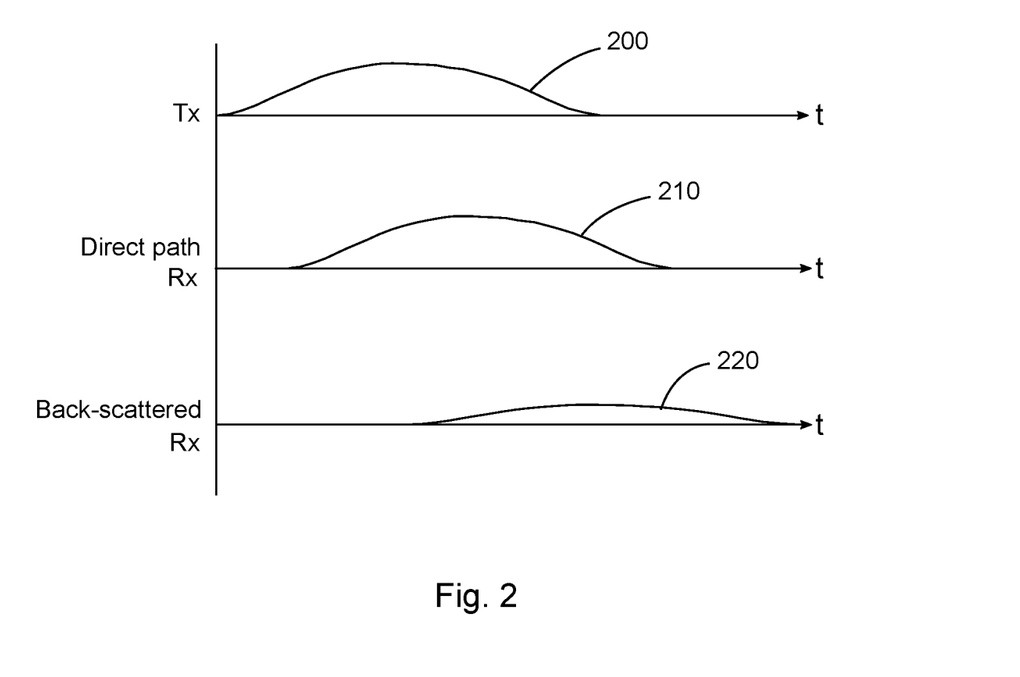
FIG. 2 illustrates signals transmitted and received during coupled radar.

FIG. 2 illustrates the amplitude 200 of a transmitted pulse as a function of time at the transmit antenna 120, the amplitude 210 of the same pulse as received at the receive antenna 130 via the direct path 185 and the amplitude 220 of the same pulse as received at the receive antenna 130 via the backscattered path 180 after reflection from a scatterer within the absorptive medium 190. It will be appreciated that the pulse shapes shown in FIG. 2 are for illustrative purposes only and do not necessarily reflect a genuine pulse shape and they omit the effects of noise for simplicity. They also only show the envelope of the amplitude of the pulse whereas in practical implementations this would be an approximated Gaussian derivative pulse shape with several peaks and troughs within the illustrated envelope. However, it can clearly be seen in FIG. 2 that the majority of the received direct path signal 210 of the pulse is being received by receive antenna 130 while the transmit antenna 120 is still transmitting. Similarly, the backscattered signal 220 is also partially received by receive antenna 130 while transmit antenna 120 is still transmitting. This is an illustration of the close range problem that afflicts coupled radar. In order to fully receive the backscattered signal 220, the radar apparatus 100 must have high sensitivity to be able to distinguish the low amplitude variations of the backscattered signal and at the same time it must have that sensitivity across a high dynamic range, i.e. while receiving a direct path signal on top of the backscattered signal (high total amplitude) as well as while receiving no direct path signal on top of the backscattered signal (low total amplitude).

Figure 3:
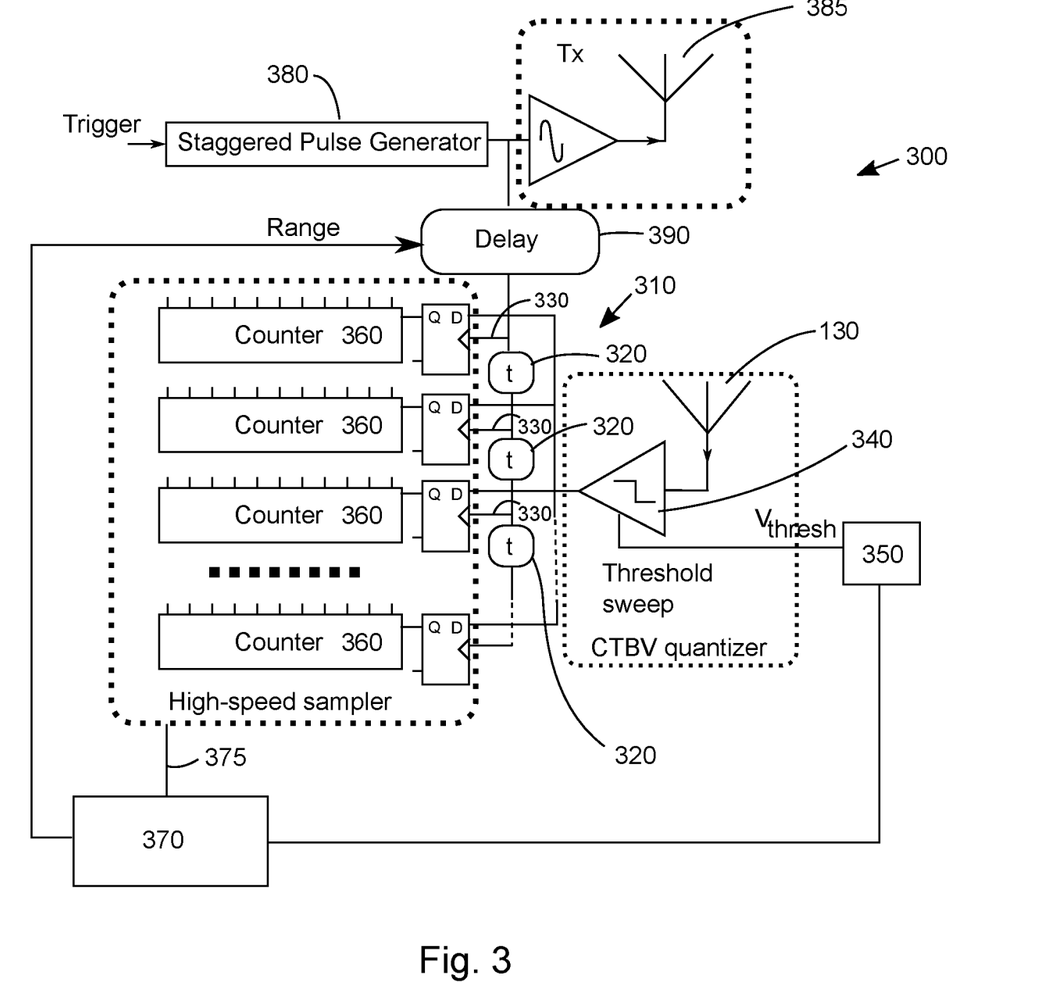
FIG. 3 schematically shows a circuit for signal processing.
Figure 4:
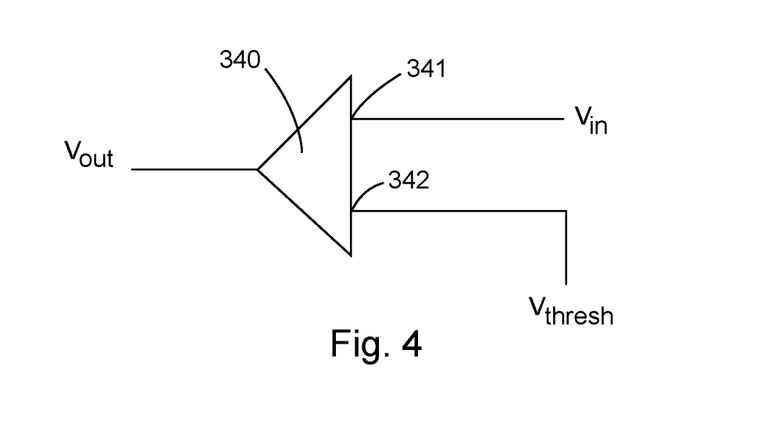
FIG. 4 shows a comparator detail.

FIG. 3 schematically illustrates a circuit 300 which can be used to detect the received signal from several depths in parallel. The received signal S(t) is received by receive antenna 130 and passed to a first input 341 of a comparator 340. The other input 342 of the comparator 340 is the threshold voltage $V_{thresh}$ against which the input signal S(t) is compared. The comparator is shown in more detail in FIG. 4. The threshold voltage is output by DAC 350 which is controlled by a microprocessor 370. The threshold voltage is varied by microprocessor 370 so as to obtain information about the signal in relation to various threshold levels.

The transmit pulse signal is generated by pulse generator 380 and transmitted via transmit antenna 385. This signal is also passed to a programmable range delay 390 which receives a range delay from microprocessor 370. The range delay 390 determines the delay before the time window of the receive signal that is to be monitored for received signal strength. For this coupled radar implementation, the range delay may be as low is zero, i.e. the system can start looking at the received signal immediately despite the presence of a direct path signal.

The delayed signal from range delay 390 is passed to delay line 310. Delay line 310 contains a number of delay elements 320 with delay line taps 330 between them. The number of delay line taps 330 determines the number of parallel depths examined. In two specific embodiments the number of delay line taps (and the number of parallel depths examined) are 256 (first embodiment) and 512 (second embodiment), although any number may be used. Each delay line tap 330 feeds the (delayed) signal to the enable input 401 of a counter 360. At the same time the output of comparator 340 is connected to the inputs of all counters 360. When the delayed signal on a particular delay line tap 330 enables a particular counter 360, that counter 360 adds the value of its input (from the comparator) to its stored value. The counters 360 can each by read out by microcontroller 370 via data bus 375.

The results of the comparisons with the threshold voltage are thus stored and accumulated in counter array elements 360. One element 360 is provided for each delay line tap 330 and thus counts the results of the comparisons for a particular sample time of the received signal S(t).

The DAC 350 may be of any size (resolution) according to the needs of the system. However, as an example, in some embodiments the DAC 350 may be a 13-bit DAC which can output the threshold voltage at any of 8192 different levels, providing a very high resolution in signal detection. With typical UWB pulse widths, a pulse can be transmitted, for example, once per nanosecond. Therefore a full sweep of all 8192 levels can be done over 100 times per second with 1000 pulses being transmitted and received at each threshold level so as to make the detected signal distinguishable from the noise level. It will be appreciated that a larger number of pluses can be transmitted at each level either by reducing the number of sweeps per second and/or by reducing the number of levels examined (i.e. performing less than a full sweep of levels). The appropriate methodology can be varied according to the measurement scenario. The methodology may be varied by the user or it may be varied automatically by software running on the processor based on an analysis of the received signal.

As discussed above, the short-range single-chip impulse radar 100 mounted on a suitable antenna 120, 130 may be used for sensing and imaging of high-absorption materials using coupling instead of or in addition to normal far-field RF antenna radiation. In this document, references to an RF absorbent material (AM) 190 typically mean a material that preferably has a permittivity at least one or two orders of magnitude larger than air and with significant conductivity. A predominant effect of these materials is that the AM-air interface is highly reflective of RF waves. As mentioned above, for microwave frequencies typically around three quarters of the radiated electromagnetic energy transmitted from distance is backscattered from the AM surface and the high absorption almost eliminates backscattered energy from inside the AM 190. However a significant improvement of RF penetration is achieved by locating the antenna(s) 120, 130 closer than one quarter of the signal wavelength ($\lambda/4$) from the AM surface. The AM-air reflection is then mostly eliminated and the antenna energy is coupled directly into the AM 190. A typical center frequency of the impulse radar described here may be 5 GHz, giving coupling when the antenna 120, 130 is closer than 1.5 cm from the AM. In this way most of the antenna energy is then transmitted into the AM 190 and may be explored for sensing and imaging purposes.

The radar impulse based technology described here enables sensing and imaging at short ranges due to short temporal pulses in combination with high dynamic range on the receiver input. The single-bit (thresholded) input state may be tuned by adjusting the thresholding level to detect a small backscattered signal on top of a large direct-path signal from the transmitter 120. This quantizing procedure is referred to herein as "Swept-threshold sampling". This technology provides good sensitivity of backscattering objects close to the radar antennas 120, 130.

The impulse radar technology described here also enables a single-chip solution and thus chip-on-antenna mounting with short RF wiring due to the short-range properties. Most wideband antennas are already fabricated on a PCB substrate 140, enabling chip mounting together with the antenna 120, 130. In this way all RF signal may be matched and contained on the apparatus 100 itself avoiding costly co-axial wiring and keeping the module size to a minimum. Only power connections and low-bandwidth digital connections are required from the single-chip radar.

The coupling impulse radar sensor may be manufactured as a flat, chip-on-antenna module containing all RF signalling and thus requiring only power and low-bandwidth digital communication connections for full operation. For improved performance the backside of the module, i.e. the side facing away from the AM 190 may be coated with absorbing foam 150 which reduces external interference from affecting operation as well as reducing external radiation from the module. This integrated platform will in the following be called the Impulse Coupling Radar (ICR).

Embodiment of Impulse Coupling Radar (ICR)

The fundamental properties of the ICR may be implemented in a number of ways usable for a large variety of applications. Three examples are as follows:

1. The ICR may be built on a standard PCB substrate (such as for example FR4) with the major area used for two antennas (Tx/Rx). Typical antennas could be bow-tie with centre feed matched directly to the radar Tx/Rx. In addition to the Impulse radar chip, some passive components and crystals are provided and additional processing units such as a microcontroller may be mounted directly on the antenna.

2. The ICR may be implemented on a flexible PCB substrate for better coupling to curved surfaces (such as human or animal bodies). Currently available PCB materials allow for direct chip/die mounting as well as wiring.

3. The ICR may be integrated with textile antennas by mounting the Impulse radar chip/die on a minimal substrate and soldering the antenna leads and other signalling leads thereto. This arrangement could be used for example for installing the ICR radar chip into clothing for monitoring (e.g. heart rate, breathing, etc.)

Applications of ICR

The ICR adds unique performance to a number of sensing/imaging applications of AM, most prominent being the human or animal body. The coupled radar solutions described here may be embodied as a single sensor or configured in a multi-static configuration (Multi-static Impulse Coupled Radar, MICR). Both configurations are usable with varying degrees of miniaturization.

Some exemplary uses of the ICR are as follows:

Single-Sensor ICR

1. A single ICR sensor may be used for SAR/iSAR ((inverse) Synthetic Aperture Radar) imaging of an Absorptive Material (AM).

a. Mounting the ICR on a portable device like a smart-phone or smart-pad, the single sensor may build up an image of internal structure of an AM through movement of the smart device. Well-established SAR algorithms may be used and resolution will improve with an increased number of scans. Also scanning over the surface in different directions may be used to create 3D images. This kind of single sensor imaging uses time to build up the image and assumes that the object under study is stable in time. Typical applications may be buildings inspection and inspection of solid structures made of heavy material. This technique is best suited to planar surfaces. Given a planar ICR, coupling efficiency may be reduced on non-planar surfaces, although improvements are possible using flexible antennas.

b. The inverse sensing situation is also possible using iSAR techniques. By mounting the ICR in a fixed position and moving the object with respect to the ICR, the object may be imaged. Again, coupling must be maintained as well as some measure of object position relative to the ICR.

2. Another class of single ICR applications is to measure some dynamic (temporal) phenomena inside some AM. The static reflections may be removed (using known clutter removal techniques) by subtraction or temporal derivation. In AM objects with several dynamic activities, interference may occur. However, signal processing techniques may be used to recover the desired signal.

a. An interesting application of the single ICR is body sensing. Applying a (flexible) ICR device on reasonably flat surfaces like the front or the back of the torso permits observation of dynamic phenomena like heart beats or lung movements. With the use of textile antennas, the ICR may be integrated as a part of clothing, e.g. to produce a smart T-shirt (or other garment). Equipped with a suitable power source (e.g. battery) and a wireless data connection, vital sign monitoring such as heart rate and also breathing may be performed. A similar body sensing ICR device may also be mounted in furniture, e.g. in the back of a chair or in a bed. Again proper coupling is required with the subject, but this can readily be achieved in situations where close contact with the furniture is normal (such as in chairs and beds). Such applications may be useful in the context of longer term health monitoring, e.g. in care homes, for example to monitor an individual while sitting and/or sleeping or to produce warnings if a subject has either not been detected in any monitored furniture for a period of time, or alternatively has not moved from a particular piece of monitored furniture for a period of time. Additional dynamic body functions may be monitored as well if desired.

b. Another use of a single ICR sensor is for monitoring of multiphase flow in pipes such as oil pipes. In fluids with a mix of materials with different permittivity, a good measure of flow is possible. Again good coupling is essential. This may be achieved in some cases by using a circular antenna arrangement fitting around the pipe. In other embodiments a planar ICR device may also be used for flow measurement inside some solid AM (e.g. within walls or the ground, etc.).

Multi-Sensor ICR

A multi-sensor or multi-module ICR may be used to give 2D or 3D images of objects inside an Absorptive Material (AM). Well-known techniques for radar imaging may be used like beamforming and/or delay-and-sum. These techniques are normally applied in far field applications, but can also be adapted for coupled radar transmissions. Preferably corrections for propagation speed within the AM as well as corrections for spherical wave propagation in the near field or extreme near field are applied. In this way, accurate images of hidden objects are feasible. In fact reduced propagation speed within the AM is traded in for higher resolution. Examples of hidden objects that may be imaged include landmines in the ground, tumours in the brain or breast, pipes in or behind a wall, etc.

The unique calibration capabilities of the ICR enable accurate focusing of an RF beam with significant improvement of the signal to noise ratio (SNR). Typical arrangements of ICR modules could be a fixed or flexible array of ICR devices for 2D imaging while a matrix or circle arrangement of ICR devices may be used to give 3D radar images. These configurations may be referred to as multi-static radar systems and they may image both static objects as well as dynamic changes of objects. The additional ICR modules can be used to increase frame-rate compared to the above-mentioned SAR techniques. In addition, beamforming will increase the SNR with the square of the number of ICR devices in the arrangement. These multi-static ICR arrangements may be used for inspection of any AM with sufficient surface for antenna coupling. Some applications include:

1. A first application is inspection of objects buried in the ground like seeking for water-pipes, cables, archeological objects, metals and/or other objects buried in the ground. Unlike the currently available Ground Penetrating Radar (GPR) solutions, the coupled ICR arrangements based on ground coupling will work at short range and without the need for movements of the antennas. The wideband properties of the ICR technology will also improve resolution due to the short temporal pulses.

2. A second application is body inspection of internal organs. An optimal multi-static arrangement of ICR modules may be circular. For example, this may be formed as a "belt" of ICR modules attached to the body surface and can be used to give radar imaging of internal organs as well as tracking of diagnostic objects like endoscope camera-capsules during medical procedures. Both 2D and 3D imaging arrangements are feasible. Flexible or semi-flexible antennas may be required for good coupling.

3. A third application makes use of the compact and low-power properties of the ICR modules to enable usage in hostile and/or narrow environments such as giving radar-vision to drill-bits in, for example, on-shore or offshore drilling (such as for oil-exploration).

The invention claimed is:

1. A method of imaging within an absorptive object comprising:
    placing transmit and receive antennas in close proximity to a surface of said object such that RF coupling occurs;
    transmitting electromagnetic pulses from the transmit antenna into the object; and
    receiving a receive signal at the receive antenna simultaneously with the transmit antenna transmitting said pulses;
    wherein the transmitting and receiving comprises the following steps:
    a) setting a threshold level for the receive signal strength;
    b) transmitting one or more pulses;
    c) sampling the receive signal at a series of sample times, comparing each sample of the receive signal for said one or more pulses with the threshold level and, in a counter array which comprises an array element corresponding to each sample time in the series of sample times, altering a respective array element corresponding to the respective sample time dependent upon the result of the respective comparison;
    d) changing the threshold level;
    e) repeating steps b), c) and optionally d) one or more times.

2. A method as claimed in claim 1, wherein steps b) and c) are repeated at least once prior to changing the threshold in step d).

3. A method as claimed in claim 2, wherein steps b) and c) are repeated more than 100 times prior to changing the threshold in step d).

4. A method as claimed in claim 3, wherein steps b) and c) and repeated more than 1000 times prior to changing the threshold in step d).

5. A method as claimed in claim 1, wherein the changes to the threshold level in step d) sweep through a range of threshold values between a minimum threshold value and a maximum threshold value.

6. A method as claimed in claim 5, wherein the changes to the threshold level in step d) sweep through a range of threshold values in one direction followed immediately by a sweep in the opposite direction.

7. A method as claimed in claim 1, wherein after step e), signal processing is used to subtract a direct path signal component from the received signal data.

8. A coupled radar apparatus comprising:
    a transmit antenna adapted for placement adjacent to a surface of an absorptive material;
    a receive antenna adapted for placement adjacent to a surface of an absorptive material;
    a pulse generator arranged to transmit electromagnetic pulses from the transmit antenna into the object;
    a receiver arranged to receive a receive signal at the receive antenna simultaneously with the pulse generator transmitting said pulses and sample the receive signal at a series of sample times;
    a counter array having an array element corresponding to each sample in the series of samples times; and
    a processor operably connected to the pulse generator and the receiver, wherein the processor is arranged to carry out the following steps:
    a) setting a threshold level for the receive signal strength;
    b) transmitting one or more pulses;
    c) comparing each sample of the receive signal for said one or more pulses with the threshold level and, in the counter array, altering a respective array element corresponding to the respective sample time dependent upon the result of the respective comparison;
    d) changing the threshold level;
    e) repeating steps b), c) and optionally d) one or more times.

9. A coupled radar apparatus as claimed in claim 8, wherein steps b) and c) are repeated at least once prior to changing the threshold in step d).

10. A coupled radar apparatus as claimed in claim 9, wherein steps b) and c) are repeated more than 100 times prior to changing the threshold in step d).

11. A coupled radar apparatus as claimed in claim 10, wherein steps b) and c) and repeated more than 1000 times prior to changing the threshold in step d).

12. A coupled radar apparatus as claimed in claim 8, wherein the changes to the threshold level in step d) sweep through a range of threshold values between a minimum threshold value and a maximum threshold value.

13. A coupled radar apparatus as claimed in claim 12, wherein the changes to the threshold level in step d) sweep through a range of threshold values in one direction followed immediately by a sweep in the opposite direction.

14. A coupled radar apparatus as claimed in claim 8, wherein the processor is further arranged to perform signal processing after step e) to subtract a direct path signal component from the received signal data.

* * * * *

UNITED STATES PATENT AND TRADEMARK OFFICE
CERTIFICATE OF CORRECTION

PATENT NO. : 10,969,483 B2
APPLICATION NO. : 15/752827
DATED : April 6, 2021
INVENTOR(S) : Lande Page 1 of 1

It is certified that error appears in the above-identified patent and that said Letters Patent is hereby corrected as shown below:

In the Claims

Column 12,
Line 14, "b) and c) and repeated" should be -- b) and c) are repeated --
Line 60, "b) and c) and repeated" should be -- b) and c) are repeated --

Signed and Sealed this
Seventh Day of March, 2023

Katherine Kelly Vidal
*Director of the United States Patent and Trademark Office*